United States Patent
Liddell et al.

(10) Patent No.: US 9,884,460 B2
(45) Date of Patent: Feb. 6, 2018

(54) MATERIAL AND APPLICATOR FOR PINHOLE AND SMALL DEFECT REPAIR

(75) Inventors: Kimm Liddell, Cincinnati, OH (US); Helena Twardowska, Cincinnati, OH (US); Robert Mark Adams, Cincinnati, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 850 days.

(21) Appl. No.: 12/852,632

(22) Filed: Aug. 9, 2010

(65) Prior Publication Data

US 2012/0034373 A1 Feb. 9, 2012

(51) Int. Cl.
| | | |
|---|---|---|
| *B05D 3/00* | (2006.01) | |
| *B32B 43/00* | (2006.01) | |
| *B29C 73/02* | (2006.01) | |
| *B05D 5/00* | (2006.01) | |
| *B05D 7/04* | (2006.01) | |
| *B05D 7/00* | (2006.01) | |
| *C09D 5/34* | (2006.01) | |
| *B05D 1/28* | (2006.01) | |

(52) U.S. Cl.
CPC ............ *B29C 73/02* (2013.01); *B05D 5/005* (2013.01); *B05D 7/04* (2013.01); *B05D 7/53* (2013.01); *C09D 5/34* (2013.01); *B05D 1/28* (2013.01)

(58) Field of Classification Search
CPC .. C05D 5/00; C05D 5/005; C05D 5/53; B29C 73/02; B29C 73/10; C09D 5/34
USPC ............... 401/183, 261, 263, 265, 266, 268; 427/140, 142
See application file for complete search history.

(56) References Cited

U.S. PATENT DOCUMENTS

| | | | |
|---|---|---|---|
| 2,951,043 A * | 8/1960 | Blank ............................ 510/213 |
| 4,752,532 A * | 6/1988 | Starka ............................ 428/482 |
| 5,028,456 A | 7/1991 | Naton | |
| 5,182,318 A | 1/1993 | Savin | |
| 5,371,117 A | 12/1994 | Parish et al. | |
| 5,607,993 A | 3/1997 | Christy | |
| 6,315,482 B1 * | 11/2001 | Girardot et al. .............. 401/266 |
| 6,403,222 B1 | 6/2002 | Harrison | |
| 6,956,069 B2 | 10/2005 | Foster et al. | |
| 7,037,865 B1 | 5/2006 | Kimberly | |
| 7,504,447 B2 | 3/2009 | Foster et al. | |
| 7,700,670 B2 | 4/2010 | Beach et al. | |
| 2003/0129300 A1 * | 7/2003 | Okada et al. ................. 427/140 |
| 2006/0032009 A1 | 2/2006 | Cheney et al. | |
| 2006/0198951 A1 * | 9/2006 | Tang et al. .................... 427/140 |
| 2007/0010609 A1 * | 1/2007 | Reynolds ..................... 524/451 |

FOREIGN PATENT DOCUMENTS

| | | |
|---|---|---|
| EP | 1669410 A1 | 6/2006 |
| JP | 4090710 A | 3/1992 |
| JP | 2006167702 A | 6/2006 |

OTHER PUBLICATIONS

International Search Report and Written Opinion, dated May 10, 2011 pertaining to International Application No. PCT/US2010/051548.
3M, Bondo(r) Glazing & Spot Putty 650, 651, 652C Material Safety Data Sheet, p. 1-10, Dec. 29, 2010, USA.
Pronto Kombi Spot Putty, Technical Data Sheet, 1 pg., Feb. 2011, USA.
Office Action issued by the Canadian Intellectual Property Office for related CA Application No. 2,805,180, dated Feb. 21, 2014.
Canadian Intellectual Property Office, Notice of Allowance, dated Apr. 10, 2015.

* cited by examiner

*Primary Examiner* — Michael Wieczorek
(74) *Attorney, Agent, or Firm* — Avery N. Goldstein; Blue Filament Law PLLC

(57) ABSTRACT

A method for finishing a repaired surface is described. The method includes wiping a sealer on the repaired surface to seal microporosity in the repaired surface, the sealer consisting essentially of a mixture of polymer, at least one filler, solvent, and optionally microspheres; and applying a top coat to the sealed surface without sanding the sealed surface, the top coat being free of visible pinholes. Sealers and tools for applying surface sealers are also described.

20 Claims, No Drawings

MATERIAL AND APPLICATOR FOR PINHOLE AND SMALL DEFECT REPAIR

BACKGROUND OF THE INVENTION

The invention relates generally to smoothing composite surfaces, such as repaired surfaces.

When a plastic part, such as an automobile panel, is repaired, a material, such as unsaturated polyester resins, primers, fillers, adhesives, or putties, is used to resurface and reshape the damaged areas. The repaired composite material is sanded to obtain a smooth surface. However, sanding creates small imperfections and pinholes in the surface which are visible when a top coat is applied. These pinholes must be sealed before the top coat is applied. The top coat is typically a multilayer coating including a primer, base coat/color, and a clearcoat.

Conventional methods of sealing the pinholes involve several steps and are very time consuming. For example, in one method, a liquid or paste sealer is dispensed onto an applicator, such as a squeegee or a spreader knife. The applicator is then used to wipe the sealer onto the porous surface. This method usually results in an excess film build of the sealer which must be removed before the next step in the process. The excess material is removed by wiping and sanding the residue.

Therefore, there is a need for improved sealers, tools for applying sealers, and methods of repairing pinholes and imperfections in composite materials.

SUMMARY OF THE INVENTION

The present invention meets this need. One aspect of the invention involves a method for finishing a repaired surface. In one embodiment, the method includes wiping a sealer on the repaired surface to seal microporosity in the repaired surface, the sealer consisting essentially of a mixture of about 10 to about 30 wt % polymer, about 10 to about 55 wt % of at least one filler, about 5 to about 30 wt % microspheres, and about 25 to about 45 wt % solvent; and applying a top coat to the sealed surface without sanding the sealed surface, the top coat being free of visible pinholes.

Another aspect of the invention involves a sealer for sealing a repaired surface. In one embodiment, the sealer consists essentially of about 10 to about 30 wt % polymer; about 10 to about 55 wt % of at least one filler; about 5 to about 30 wt % microspheres; and about 20 to about 45 wt % solvent.

Another aspect of the invention relates to a tool for applying a surface sealer. In one embodiment, the tool includes an applicator impregnated with a dry sealer for sealing microporosity on a surface, the dry sealer consisting essentially of a mixture of a polymer, at least one filler, and optionally microspheres, the dry sealer being dissolvable in a solvent.

DETAILED DESCRIPTION OF THE INVENTION

A sealer is applied to a repaired surface to seal microporosity in the repaired surface. The sealer typically includes about 10 to about 30 wt % polymer, about 10 to about 55 wt % of at least one filler, 0 to about 30 wt % microspheres, and about 20 to about 45 wt % solvent. The sealer can be applied without excess material being deposited. Therefore, there is no need to sand the surface before applying the top coat. The top coat typically includes a primer, a base coat/color, and a clear coat, although other types of top coats could also be used.

Suitable polymers include, but are not limited to, cellulose polymers, such as nitrocellulose polymers and cellulose acetate butyrate, acrylic polymers (including methacrylic polymers) polyester polymers, urethane polymers, and epoxies, and combinations thereof. The polymer is generally present in an amount of about 10 to about 30 wt %, or about 15 to about 30 wt %, or about 20 to about 30 wt %, or about 15 to about 25 wt %.

The polymer composition includes one or more fillers. Suitable fillers include, but are not limited to, talc, titanium dioxide, clay, calcium carbonate, silica, and the like. The filler is generally present in an amount of about 10 to about 55 wt %, or about 10 to about 35 wt %, or about 10 to about 25 wt %, or about 10 to about 20, or about 10 to about 15 wt %.

Microspheres can optionally be included, if desired. It is believed that microspheres fill pin holes more efficiently than other types of fillers because of their larger size (particle size range 5-200 microns). With a composition using only other types of fillers (typical particle size 2-15 microns), the application may need to be repeated several times to fill larger pin holes because of the small size of the filler, while a composition including microspheres may only require one pass. Microspheres are generally present in an amount of 0 to about 30 wt %, or about 5 to about 30 wt %, or about 10 to about 30 wt %, or about 15 to about 30 wt %, or about 20 to about 30 wt %.

The appropriate solvent will depend on the polymer used. For example, acetone can be used with acrylic polymers, nitrocellulose polymers, polyesters, epoxies, and urethanes. Suitable solvents include, but are not limited to, acetone, xylene, ethylene glycol monobutyl ether, methoxy propyl acetate, isopropyl alcohol, isobutyl acetate, toluene, dimethyl carbonate, or combinations thereof. The solvent is generally present in an amount of about 20 to about 40 wt %, or about 25 to about 40 wt %, or about 30 to about 40 wt %.

The composition can include small amounts of other materials typically used, such as dispersants, stabilizers, colorants, and the like.

In one embodiment, an applicator is impregnated by dispensing the sealer in liquid form onto the applicator at the time of use. The wet applicator is then used to wipe the material onto the surface to fill in the pinholes and microporosity. The sealer does not leave a residue that interferes with the top coat adhesion and surface profile.

In another embodiment, the sealer is applied to the applicator, which is then dried, leaving the solids of the composition impregnated in the applicator. The applicator can be manufactured and sold with the dry sealer impregnated for ease of use. Suitable polymers for this embodiment are any polymers which can change from a liquid state to a solid state and act as a sealer. The polymers discussed above are suitable for this embodiment as well.

In this embodiment, the polymer composition remains solid until the applicator is wetted with a solvent. The solvent causes the sealer to become soluble, allowing the polymer, filler, and optional micro spheres to transfer onto the porous surface with hand pressure and a wiping motion in order to fill the microporosity. The applicator picks up the excess residue at the same time, eliminating the need to sand the surface or remove the excess material in a separate step. The excess residue dries in the applicator tool and can be reused in a later application. The solvent used to wet the applicator can be the same solvent used in making the sealer, or it can be different.

The applicator should be absorbent to allow for impregnation. It should also be solvent resistant to maintain its physical integrity during the life of the product. Suitable materials for the applicator tool include, but are not limited to, foams and absorbent toweling. Suitable foams include, but are not limited to open cell polyurethane foams.

EXAMPLE 1

Resin and fillers were mixed with acetone as the solvent in the quantities indicated in Table 1. Foam material was placed in the dispersion and impregnated with the mixture. The impregnated foam was dried at 50C until all of the solvent was evaporated, typically about 2-3 hrs. Before use, the applicator with the dry sealer was wetted out with acetone to dissolve the polymer and other materials and allow it to flow from the foam to the treated surface and fill the pin holes.

TABLE 1

| | Component | | | | | | |
|---|---|---|---|---|---|---|---|
| | A | B | C | D | E | F | G |
| Polyester (Epotuf 91-314) | 10 | 20 | 30 | | | | |
| Epoxy (Epotuf 38-505) | | | | 10 | | | |
| Acrylic (Paraloid B-84) | | | | | 10 | 20 | |
| Unsaturated polyester (Fine-Clad M-8100) | | | | | | | 10 |
| Talc (Nicron 554) | 25 | 20 | 10 | 25 | 25 | 20 | 25 |
| Calcium carbonate (Camel White) | 30 | 20 | 15 | 30 | 30 | 20 | 30 |
| Acetone | 35 | 40 | 45 | 35 | 35 | 40 | 35 |

EXAMPLES 2 and 3

The resin, fillers, and microspheres were mixed with solvent as indicated in Tables 2 and 3. The liquid high solids polymer composition was then applied to the applicator.

TABLE 2

| | Component | | | | | |
|---|---|---|---|---|---|---|
| | A | B | C | D | E | F |
| Polyester resin (Epotuf D808-XD-71) | 10 | 20 | 20 | 20 | 20 | 25 |
| Solvent (Xylene) | 15 | 12 | 9 | 9 | 5 | 6 |
| Solvent (Ethylene glycol monobutyl ether) | 3 | 3 | | | 7 | 8 |
| Solvent (Methoxy propyl acetate) | | | | | | 7 |
| Solvent (Isopropyl alcohol) | 4 | 3 | 4 | 4 | | |
| Dispersant (BYK 410) | | | | | | 0.8 |
| Resin/solvent (CAB (Cellulose Acetate Butyrate) 30% solution in methoxy propyl acetate | | | 18 | | 18 | |
| Resin/solvent (CAB 30% solution in isobutyl acetate) | 18 | 18 | | 18 | | |
| Talc (Nicron 554) | 24.7 | 22.7 | 24.7 | 21.7 | 20 | 21.2 |
| Calcium carbonate (Camel White) | 25 | 21 | 20 | 20 | 22.7 | 24.7 |
| Microspheres (PQ 7040S) | | | | 5 | 4 | 4 |
| Microspheres (S 22) | | | 3 | 2 | 3 | 3 |
| Colorant (Black iron oxide) | 0.3 | 0.3 | 0.3 | 0.3 | 0.3 | 0.3 |

TABLE 3

| | Component | | | | | |
|---|---|---|---|---|---|---|
| | A | B | C | D | E | F |
| Polyester resin (Epotuf D808-XD-71) | 20 | 18 | 20 | 20 | 20 | 20 |
| Solvent (Xylene) | 9.5 | 6 | 9.8 | 9.8 | 8 | 6.5 |
| Solvent (Ethylene glycol butyl ether) | 6 | 6 | 8 | 8 | 8 | 6 |
| Solvent (Methoxy propyl acetate) | 2 | 6 | 7.5 | 7.5 | 7.5 | 7 |
| Resin/solvent (CAB 30% solution in methoxy propyl acetate) | 19 | 18 | 19 | 20 | 19 | 19 |
| Silica (Aerosil 200) | 1.8 | | 1.2 | 1.2 | 1.2 | 1.2 |
| Talc (Nicron 554) | 24 | 16.1 | 10 | 14 | 10 | 10 |
| Calcium carbonate (Camel White) | 17.4 | 18.5 | | | | |
| Microspheres (PQ 7040S) | | 6.5 | 24 | 11 | | |
| Microspheres (25P45) | | 4.6 | | 8 | | |
| Microspheres (Extendospheres TG) | | | | | 26 | 30 |
| Colorant (Black iron oxide) | 0.3 | 0.3 | 0.5 | 0.5 | 0.3 | 0.3 |
| Viscosity B@ 5 rpm | 26K | 6K | 4.4K | 6K | 4K | 5.2K |
| viscosity B@ 50 rpm | 5.4K | 2.5K | 1.5K | 1.8K | 1.2K | 1.8K |
| TI | 4.8 | 2.4 | 2.9 | 3.3 | 3.3 | 2.9 |

The surface to be repaired was treated by applying the applicator in a wiping motion on one half and the other half is left untreated for comparison.

Repairs of surfaces exhibiting pinholes and microporosity were made using the sealers shown in Tables 1-3. Several one square foot areas were repaired. Each repair had pinholes created naturally and also some created artificially for control purposes. The sealer was used/applied to one half of the repair panel(s). Top coats (acrylic urethane primer, polyester base coat/color, and polyurethane clearcoat) were applied over the sealer using standard automotive spray equipment and processes. After top coat application, pinholes were visible in the un-treated area. Pinholes where not visible where the sealer was applied.

Compositions C-F (containing microspheres) in Table 2 had improved results compared to Compositions A-B (without microspheres).

Based on the results of Example 2, the amount of microspheres was increased for the compositions in Table 3. Composition A in Table 3 required at least three applications, and the surface had to be cleaned with a solvent. Compositions B-F displayed good application, and no solvent wipe was required to remove excess sealer.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:
1. A method for finishing a repaired surface comprising:
    repairing a damaged surface with a material selected from unsaturated polyester resins, primers, fillers, adhesives, or putties;
    wiping a liquid sealer on the repaired surface to fill pinholes and microporosity in the repaired surface without depositing excess residue, the sealer consisting essentially of a mixture of about 10 to about 30 wt % polymer, about 10 to about 55 wt % of at least one filler, about 5 to about 30 wt % microspheres, and about 20 to about 45 wt % solvent, the polymer being re-dissolvable in solvent; and applying a top coat to the sealed surface without sanding the sealed surface, the top coat being free of visible pinholes.

2. The method of claim 1 wherein the sealer comprises about 15 to about 30 wt % polymer, about 10 to about 35 wt % of the at least one filler, about 10 to about 30 wt % microspheres, and about 30 to about 45 wt % solvent.

3. The method of claim 1 wherein the sealer comprises about 20 to about 30 wt % polymer, abut 10 to about 25 wt % of the at least one filler, about 15 to about 30 wt % microspheres, and about 30 to about 40 wt % solvent.

4. The method of claim 1 wherein the polymer is a cellulose polymer, an acrylic polymer, a urethane polymer, polyester polymer, an epoxy polymer, or combinations thereof.

5. The method of claim 1 wherein the at least one filler is talc, titanium dioxide, clay, calcium carbonate, silica, or combinations thereof.

6. The method of claim 1 wherein the solvent is acetone, xylene, ethylene glycol monobutyl ether, methoxy propyl acetate, isopropyl alcohol, isobutyl acetate, toluene, or dimethyl carbonate, or combinations thereof.

7. The method of claim 1 wherein the sealer is applied using an applicator impregnated with the sealer.

8. The method of claim 7 wherein the applicator is made of foam or absorbent toweling.

9. The method of claim 7 wherein the applicator is impregnated with the sealer by placing the applicator in the sealer and removing the solvent from the applicator forming a dried sealer on the applicator, and further comprising wetting the applicator with the dried sealer with a second solvent before wiping the sealer on the repaired surface.

10. The method of claim 9 further comprising removing the second solvent from the applicator after wiping the sealer on the repaired surface.

11. The method of claim 10 further comprising wetting the applicator with a third solvent.

12. A method for finishing a repaired surface comprising:
impregnating an applicator with a sealer by placing the applicator in the sealer and removing the solvent from the applicator forming a dried sealer on the applicator, the sealer consisting essentially of a mixture of about 10 to about 30 wt % polymer, about 10 to about 55 wt % of at least one filler, about 5 to about 30 wt % microspheres, and about 20 to about 45 wt % solvent;

wetting the applicator with the dried sealer with a second solvent to form a wetted sealer;

wiping the wetted sealer on the repaired surface to seal microporosity in the repaired surface; and applying a top coat to the sealed surface without sanding the sealed surface, the top coat being free of visible pinholes.

13. The method of claim 12 further comprising removing the second solvent from the applicator after wiping the sealer on the repaired surface.

14. The method of claim 12 further comprising wetting the applicator with a third solvent.

15. The method of claim 12 wherein the sealer comprises about 15 to about 30 wt % polymer, about 10 to about 35 wt % of the at least one filler, about 10 to about 30 wt % microspheres, and about 20 to about 45 wt % solvent.

16. The method of claim 12 wherein the sealer comprises about 20 to about 30 wt % polymer, abut 10 to about 25 wt % of the at least one filler, about 15 to about 30 wt % microspheres, and about 25 to about 40 wt % solvent.

17. The method of claim 12 wherein the polymer is a cellulose polymer, an acrylic polymer, a urethane polymer, polyester polymer, an epoxy polymer, or combinations thereof.

18. The method of claim 12 wherein the at least one filler is talc, titanium dioxide, clay, calcium carbonate, silica, or combinations thereof.

19. The method of claim 12 wherein the solvent is acetone, xylene, ethylene glycol monobutyl ether, methoxy propyl acetate, isopropyl alcohol, isobutyl acetate, toluene, or dimethyl carbonate, or combinations thereof.

20. The method of claim 12 wherein the applicator is made of foam or absorbent toweling.

* * * * *